(12) United States Patent
Takeda et al.

(10) Patent No.: US 6,945,705 B2
(45) Date of Patent: Sep. 20, 2005

(54) OPTICAL CONNECTOR

(75) Inventors: Jun Takeda, Tokyo (JP); Yuichi Koreeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/665,557

(22) Filed: Sep. 22, 2003

(65) Prior Publication Data

US 2004/0076378 A1 Apr. 22, 2004

(30) Foreign Application Priority Data

Oct. 4, 2002 (JP) ........................................ 2002-292412

(51) Int. Cl.[7] ................................................ G02B 6/36
(52) U.S. Cl. ........................................ 385/77; 385/139
(58) Field of Search .............................. 385/53, 70, 73, 385/76, 77, 78, 139, 140

(56) References Cited

U.S. PATENT DOCUMENTS

| | | | | |
|---|---|---|---|---|
| 5,506,922 A | * | 4/1996 | Grois et al. | 385/75 |
| 5,956,444 A | * | 9/1999 | Duda et al. | 385/53 |
| 6,340,246 B1 | * | 1/2002 | Yoshida et al. | 385/73 |
| 6,352,375 B1 | * | 3/2002 | Shimoji et al. | 385/92 |
| 6,471,412 B1 | * | 10/2002 | Belenkiy et al. | 385/53 |
| 6,685,362 B2 | * | 2/2004 | Burkholder et al. | 385/78 |
| 6,688,780 B2 | * | 2/2004 | Duran | 385/76 |

FOREIGN PATENT DOCUMENTS

| | | |
|---|---|---|
| EP | 0374136 | 5/1985 |
| EP | 0788002 | 8/1997 |
| EP | 0962799 | 12/1999 |
| JP | 6201953 | 7/1994 |
| JP | 2000-347075 | 12/2000 |
| JP | 2002-243978 | 8/2002 |

OTHER PUBLICATIONS

Anonymous: "Fiber Optic Module Interface Attachment," Research Disclosure, Kenneth Mason Publications, Hampshire, GB, dated Oct. 1991.

"Fiber–Optic Connector Interface Scheme That Provides for Worldwide Class 1 Laser Certification"—IBM Technical Disclosure Bulletin, vol. 37, No. 1, 1994, pp. 143–144 dated Jan. 1994.

European Search Report dated Nov. 17, 2004.

* cited by examiner

Primary Examiner—Thanh-Tam Le
(74) Attorney, Agent, or Firm—Baker Botts L.L.P.

(57) ABSTRACT

An optical connector includes a housing including a coupling portion for coupling another optical connector and a blocking component for blocking an optical axis arranged in the coupling portion. The blocking component has a shutter plate blocking the optical axis and being pivotably supported by the housing with a pivot shaft and an elastic portion for normally biasing the shutter plate to a closed position. The shutter plate pivots between a position blocking the optical axis and a position to which the shutter plate is forced to move by the other optical connector when the other optical connector is inserted into the optical connector.

6 Claims, 9 Drawing Sheets

OPTICAL CONNECTOR

This application claims priority to prior Japanese application JP 2002-292412, the disclosure of which is incorporated herein by reference.

BACKGROUND OF THE INVENTION

1. Field of the Invention

The present invention relates to an optical connector that connects optical fibers and, further, to a structure that block light traveling inside of a connector.

2. Description of the Related Art

To block light emitted from an optical fiber inside of an optical connector, blocking the optical axis of the optical connector by attaching an elastic body to a housing of the connector or of an adapter for the connector is conventionally used.

A conventional optical connector is disclosed in Japanese Unexamined Patent Application Publication No. 6-201953 (hereinafter referred to as Reference 1). In Reference 1, a sleeve portion for the optical connector includes a sleeve, having openings which are covered by movable protective flaps. The protective flaps are placed under spring tension by a leaf spring mounted at the front end of the plug and are forced from the closed position into the open position during insertion of a plug ferrule into the sleeve. The protective flaps pivot between an inner sleeve housing and an outer sleeve housing.

Japanese Unexamined Patent Application Publication No. 2000-347075 (hereinafter referred to as Reference 2) describes a conventional adapter for an optical connector. The adapter according to Reference 2 includes a light emitting element emitting a laser beam, a base having a first spring, and a blocking component having a shutter. On insertion of a plug, the base is elastically deformed at the first spring according to the movement of the inserted plug to allow the shutter to move out of the optical path of the laser beam. On extraction of the plug, the elastically deformed base is restored according to the movement of the extracted plug to allow the shutter to block or shade the optical axis of the laser beam.

Reference 2 also discloses another type of shutter in which a pair of synthetic resin or metal bases is connected by a leaf spring and one of the bases is connected to a shutter portion by a wedged leaf spring.

Japanese Unexamined Patent Application Publication No. 2002-243978 (hereinafter referred to as Reference 3) describes a conventional adapter for an optical connector. According to the adapter in Reference 3, insertion of an optical connector presses a blocking component including an elastic body mounted in an adapter housing downward in the direction of insertion to block the optical axis in the optical connector. Specifically, a coupling portion for coupling the optical connector includes the blocking or shading component, which comprises an elastic thin plate. On coupling the optical connector, the blocking component is pressed downward in the direction of insertion in accordance with the movement of the optical connector and is placed between the inner wall of the adapter and the outer face of the optical connector to unblock the optical axis. On extraction of the optical connector, the depressed blocking component rises up by elasticity and is restored to the position blocking the optical axis again. The blocking component is capable of being removably mounted in the adapter.

In the foregoing conventional optical plug connector and adapters, opening and closing of the blocking component use the resilience of the integrated or discrete elastic member itself. Therefore, to permit scaling up of the blocking component as a result of the increased number of optical fiber cores, the resilience is required to increase. The increase in the resilience of the elastic member results in increased insertion force of the plug, which is not suitable for an optical connector for multiple cores.

Since the optical axis is centered in many types of optical connectors, the blocking component must be greatly deformed upward or downward relative to the center upon insertion of the plug. Thus the necessary resilience of the blocking component increases even in optical connectors for a single core.

SUMMARY OF THE INVENTION

It is an object of the present invention to provide an optical connector including a blocking component suitable for multiple cores without a change in insertion force of a plug of another optical connector.

According to the present invention, there is provided an optical connector which comprises a housing including a coupling portion for coupling another optical connector and a blocking or shading component for blocking an optical axis arranged in the coupling portion. In the optical connector, the blocking component has a shutter plate blocking the optical axis and being pivotably supported by the housing with a pivot shaft and an elastic portion for normally biasing the shutter plate to a closed position. The shutter plate includes an opening in which the elastic portion is disposed, and the shutter plate pivots between a position blocking the optical axis and a position to which the shutter plate is forced to move by the other optical connector when the other optical connector is inserted into the optical connector.

Moreover, according to the present invention, in the optical connector, the elastic portion applies a force to the shutter plate at a side of the pivot shaft and an opposite side thereof so that the shutter plate is disposed in the position blocking the optical axis.

DESCRIPTION OF THE PREFERRED EMBODIMENTS

In order that the present invention may be fully understood, an optical connector and adapters in the known art will now be described with reference to FIGS. 1 to 4 before explaining embodiments of the present invention.

Figure 1:
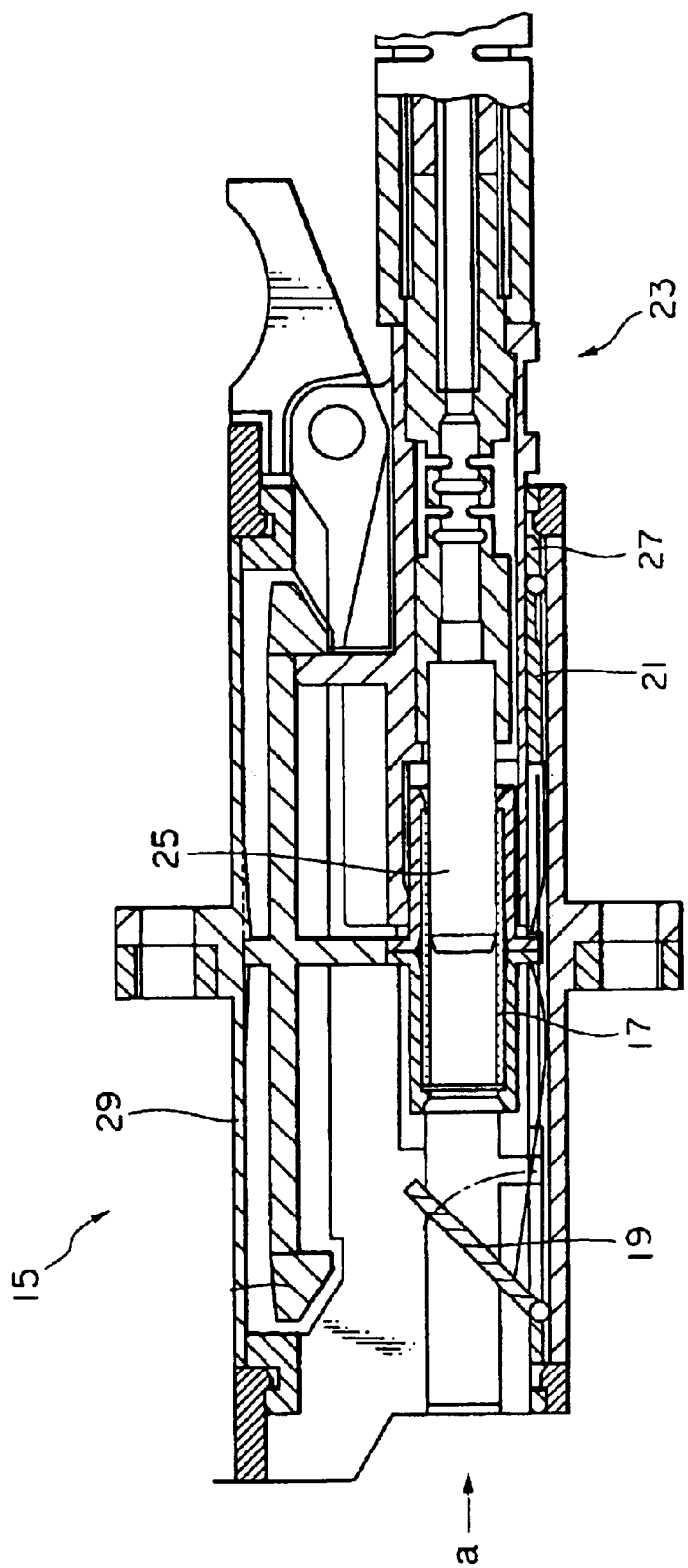
FIG. 1 is a cross-sectional view showing a conventional optical connector.

Referring to FIG. 1, a sleeve portion 15 for an optical connector according to Reference 1 includes a sleeve 17 of which openings are covered by movable protective flaps 19 and 21. The protective flaps 19 and 21 are placed under spring tension by a leaf spring mounted at the front end of a plug 23 and are forced from the closed position into the open position during insertion of a plug ferrule 25 into the sleeve 17. The protective flaps 19 and 21 pivot between an inner sleeve housing 27 and an outer sleeve housing 29.

Figure 2:
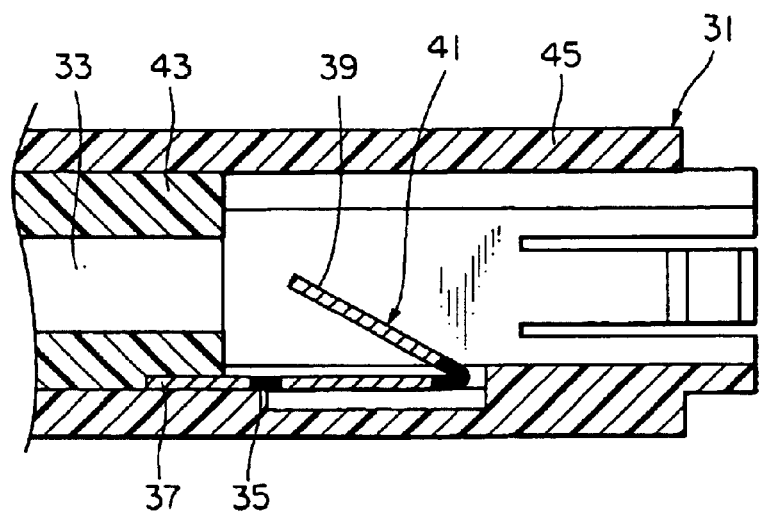
FIG. 2 is a partial cross-sectional view of a conventional adapter for an optical connector.

Referring to FIG. 2, an adapter 31 for an optical connector according to Reference 2 includes a housing 45, a sleeve provided in the housing 45, a light emitting element 33 emitting a laser beam adapted to the sleeve 43, a base 37 having a first spring 35, and a blocking or shading component 41 having a shutter 39. Upon insertion of a plug, the base 37 is elastically deformed at the first spring 35 according to the movement of the inserted plug to allow the shutter 39 to move out of the optical path of the laser beam. On extraction of the plug, the elastically deformed base 37 is restored according to the movement of the extracted plug to allow the shutter 39 to block the optical axis of the laser beam.

Figure 3:
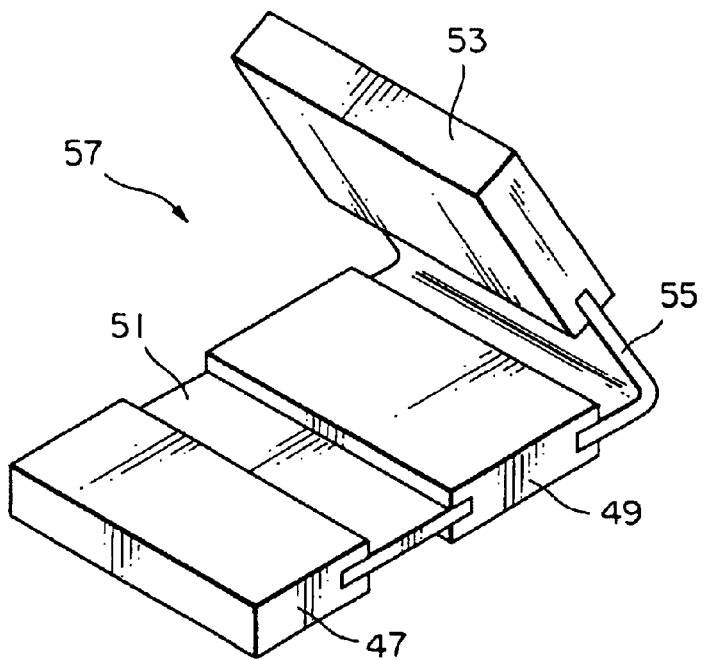
FIG. 3 is a perspective view showing a shutter of the adapter of FIG. 2.

FIG. 3 shows another shutter of the adapter of FIG. 2. In a shutter 57, synthetic resin or metal bases 47 and 49 are connected by a leaf spring 51 and the base 49 is connected to a shutter portion 53 by a wedged leaf spring 55.

Figure 4:
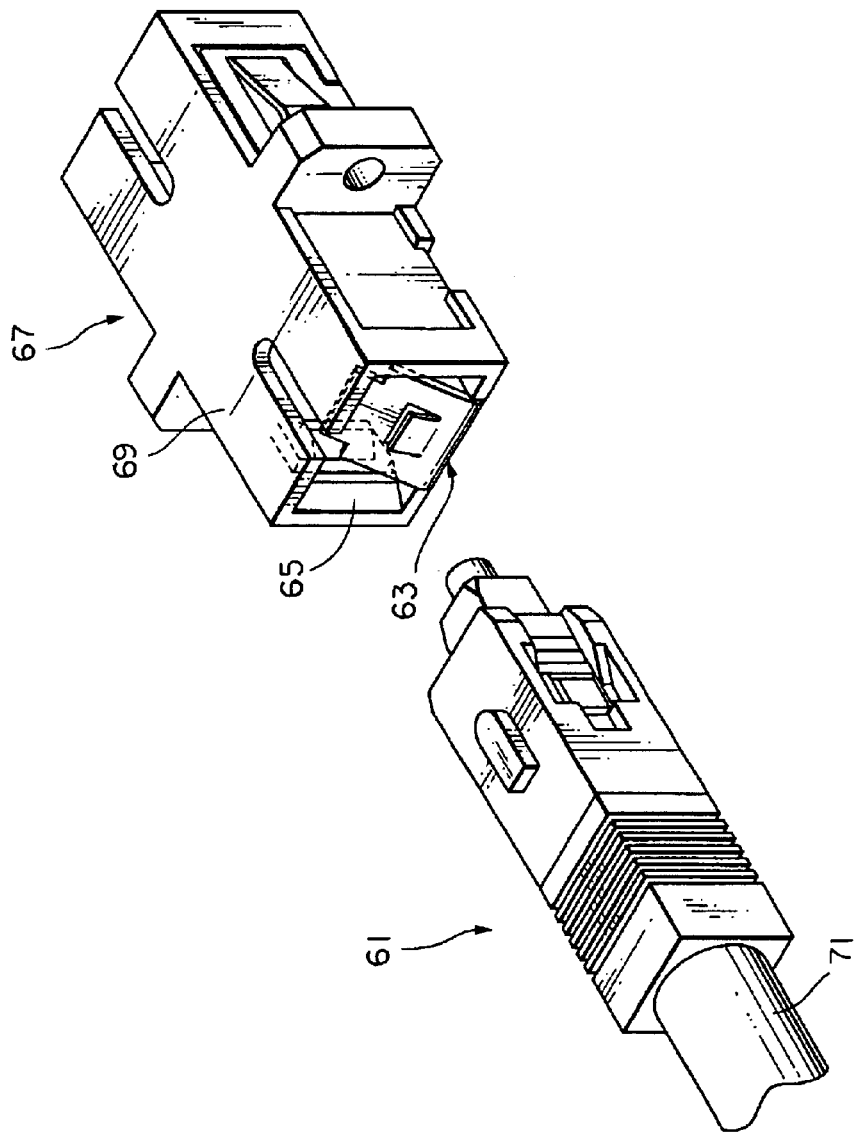
FIG. 4 is an exploded perspective view of a conventional adapter for an optical connector.

Referring now to FIG. 4, in an adapter 67 for an optical connector according to Reference 3, insertion of an optical connector 61 presses a blocking component 63 including an elastic body mounted in an adapter housing 69 downward in the direction of insertion to block the optical axis in the optical connector 61. Specifically, a coupling portion 65 for coupling the optical connector 61 includes the blocking component 63, which comprises an elastic thin plate. The optical connector 61 has an optical fiber cable 71. Upon coupling the optical connector 61, the blocking component 63 is pressed downward in the direction of insertion in accordance with the movement of the optical connector 61 and is placed between an inner wall of the adapter 67 and an outer face of the optical connector 61 to allow unblocking the optical axis. Upon extraction of the optical connector 61, the depressed blocking component 63 rises up due to its elasticity and is restored to a position blocking the optical axis again. The blocking component 63 is capable of being removably mounted in the adapter 67.

The embodiments of the present invention will now be described with reference to FIGS. 5 to 14. For convenience, an opening side and a back side in FIGS. 5 and 6 are designated as the front and the rear, respectively.

Figure 5:
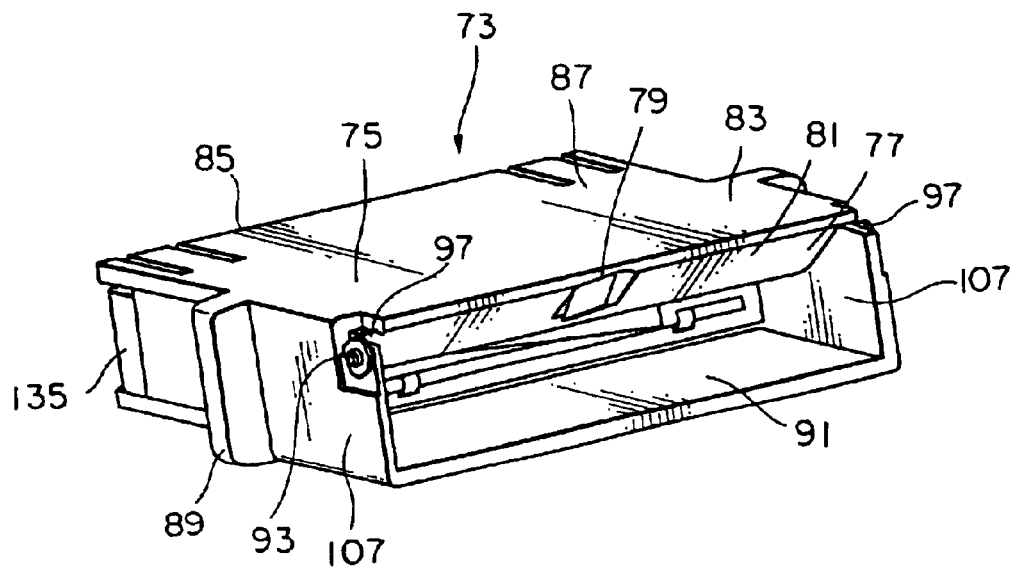
FIG. 5 is a perspective view of an optical connector according to an embodiment of the present invention as seen from the left-hand side front.
Figure 6:
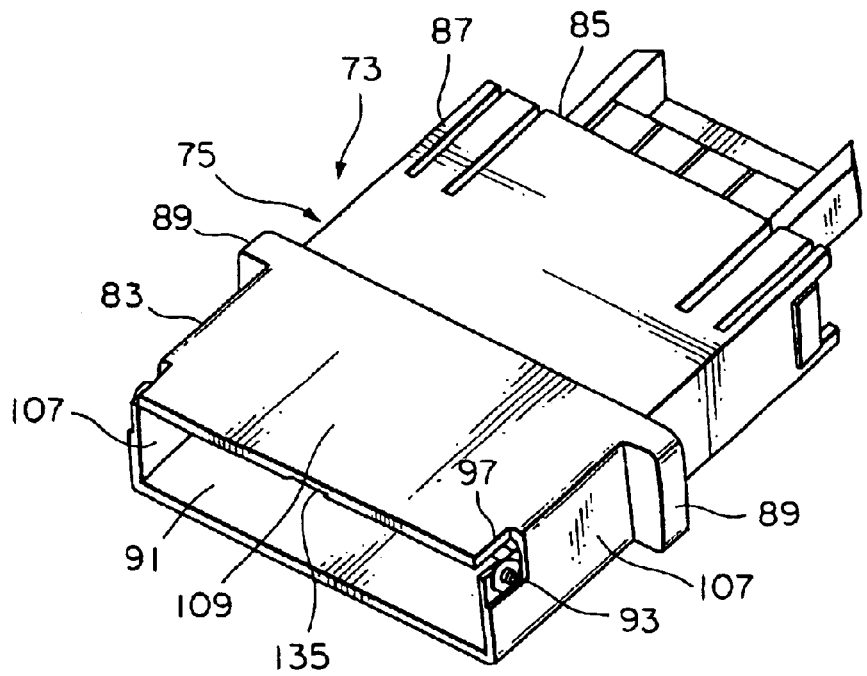
FIG. 6 is a perspective view of the optical connector of FIG. 5 as seen from the upper right.
Figure 7:
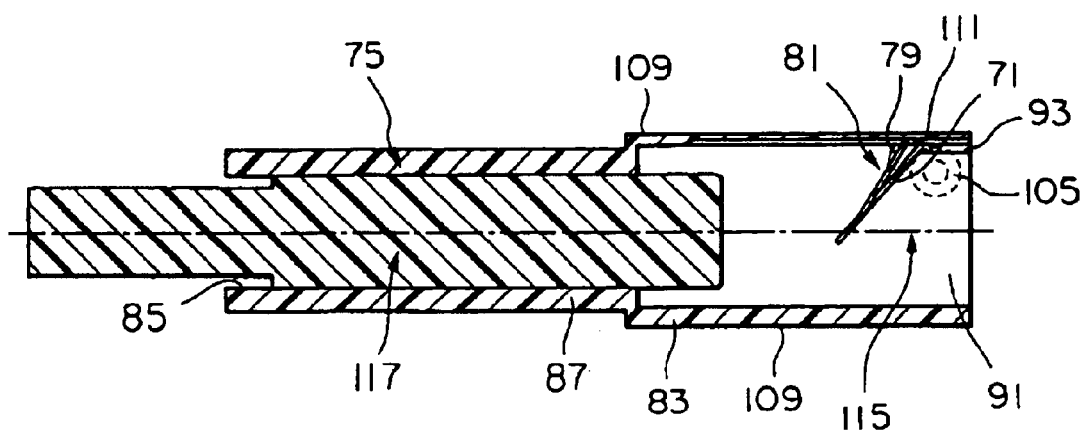
FIG. 7 is a cross-sectional view of the optical connector of FIG. 6.

Referring to FIGS. 5 to 7, an optical connector 73 includes a housing 75 having openings 91, 85 in the front and the rear thereof, and a blocking or shading component 81 having a shutter plate 77 and an elastic portion 79.

Figure 8:
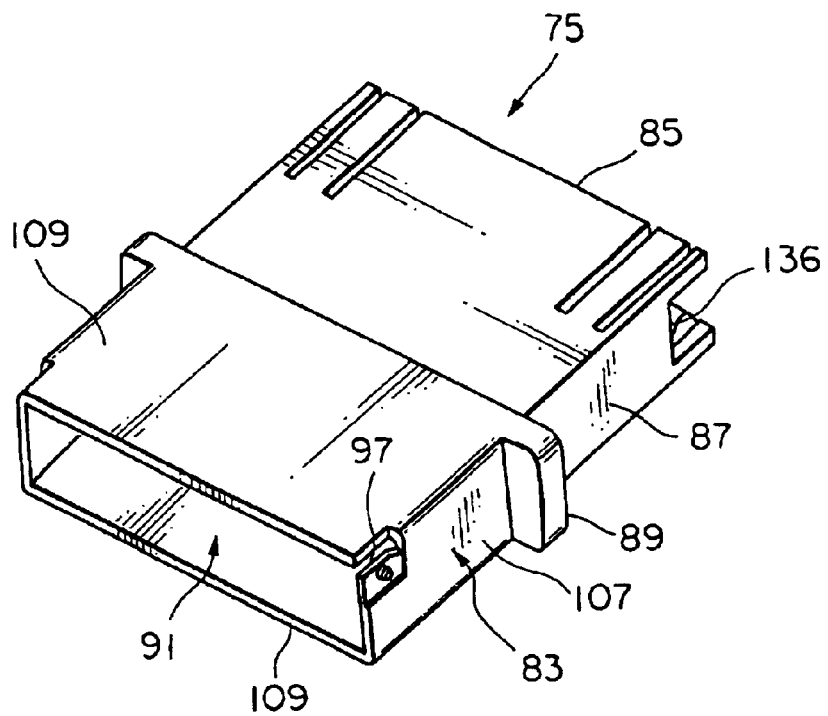
FIG. 8 is a perspective view of a housing of the optical connector of FIG. 6.

As shown in FIGS. 6 to 8, the housing 75 includes a first housing 83 and a second housing 87, both of which are formed axially in an integrated structure. The first housing 83 has an opening at one end and is rectangular prism shaped. The second housing 87 has the opening 85 having smaller inside dimensions than the first housing and is similarly rectangular prism shaped. At both sides of the rear end of the first housing 83, handling portions 89 project laterally to handle the housing manually when coupling another optical connector or the like.

In the second housing 87, a plug 117 of the optical connector is inserted through the opening 85 at the rear of the housing 75 with the optical connecting face of the inserted plug 117 projecting into the first housing 83.

On the other hand, the first housing 83 has the blocking component 81 adjacent to a coupling portion 91 of the opening for coupling a plug 113 of another optical connector. The blocking component 81 comprises the rectangular shutter plate 77 and the slender elastic portion 79, both of which are formed from a metal plate in an integrated structure.

Figure 10:
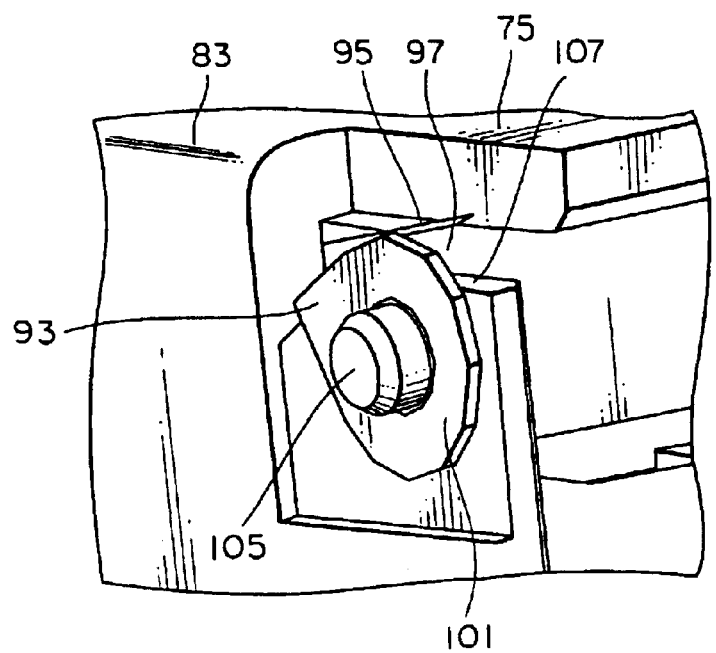
FIG. 10 is a partial perspective view showing mainly a pivot shaft portion of the blocking component at one side of a housing.
Figure 11:
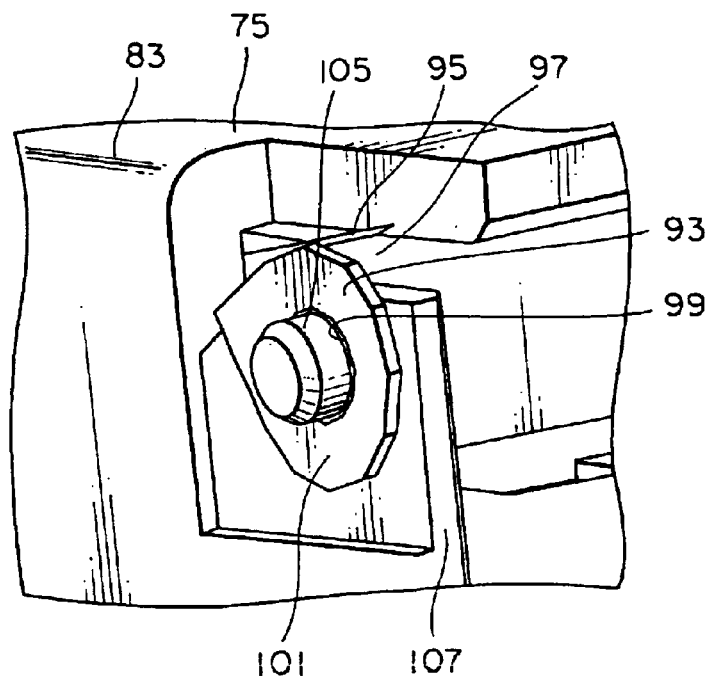
FIG. 11 is a partial perspective view for explanation of pivoting of the blocking component at the one side of the housing.

As best seen in FIGS. 10 and 11, a rectilinear portion 95 of a pivot component 93 at one side of the blocking component 81 is mounted in a groove 97 provided across an inner upper face of the housing 75 from the opening toward the rear of the housing 75. A cylindrical lug 105 of the housing 75 is fitted into a central bore 99 of a ring portion 101 of the pivot component 93. The lug 105 projects from a side wall 107 of the housing 75 and below the groove 97.

Figure 12:
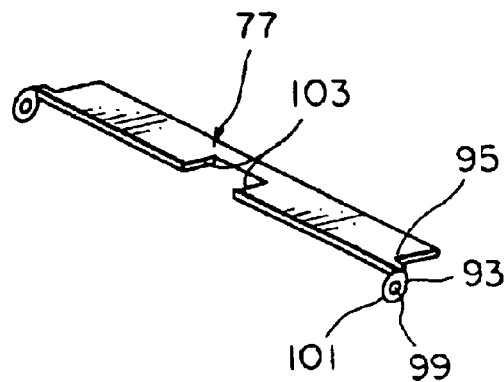
FIG. 12 is a perspective view of a shutter plate of the blocking component, in which an elastic body is not shown for the sake of simplicity.

As best seen in FIG. 12, the shutter plate 77 comprises a material resistant to deformation and includes the rectilinear portion 95 at each end at both sides and the pivot component 93 having the ring portion 101 bent at a right angle to the rectilinear portion 95. The shutter plate 77 has a cutaway portion 103 in which the elastic portion 79 is disposed. This cutaway portion forms the opening and, in reality, has the elastic portion 79 inside.

Figure 9:
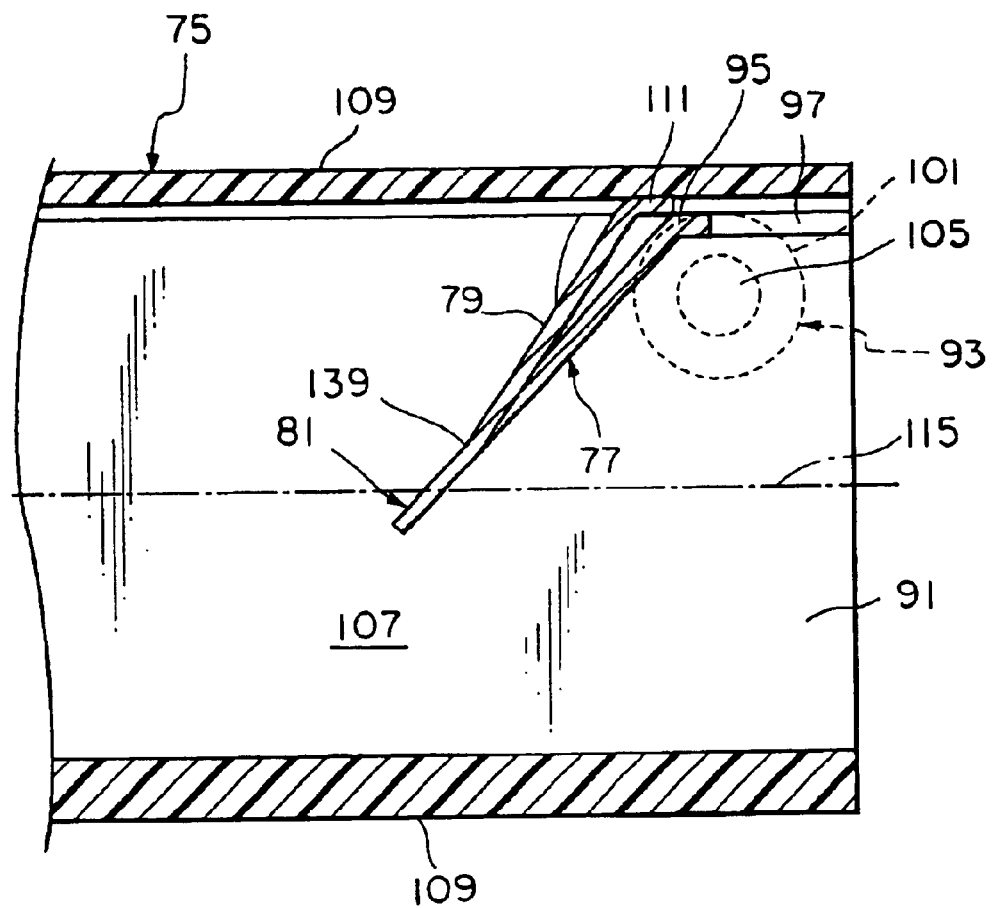
FIG. 9 is a cross-sectional view showing mainly a blocking component of the optical connector of FIGS. 5 and 6.

Accordingly, as shown in FIG. 9, the pivot component 93 enables the shutter plate 77 to be pivotable about the lug 105 in the coupling direction and to be positioned. If the shutter plate 77 pivots forward, the rectilinear portion 95 impinges on the end of the groove 97, thereby preventing further pivoting of the shutter plate 77. This position allows the shutter plate 77 to block an optical axis 115. The front end of the shutter plate 77 is mounted inclined behind a portion supported by the pivot component 93.

The elastic portion 79 has a bent end, which forms a support portion 111 mounted on an upper or bottom face 109 of the housing 75. A base 139 at the other end of the elastic portion 79 (FIG. 9) is integrated with the shutter plate 77 adjacent to the opposite end of the end having the pivot component 93 of the shutter plate 77. Before insertion of the plug 113 of another optical connector (see FIG. 14), this elastic portion 79 is preloaded to apply a force to the shutter plate 77 so that the shutter plate 77 can maintain a position blocking the optical axis, as shown in FIG. 9.

Figure 13:
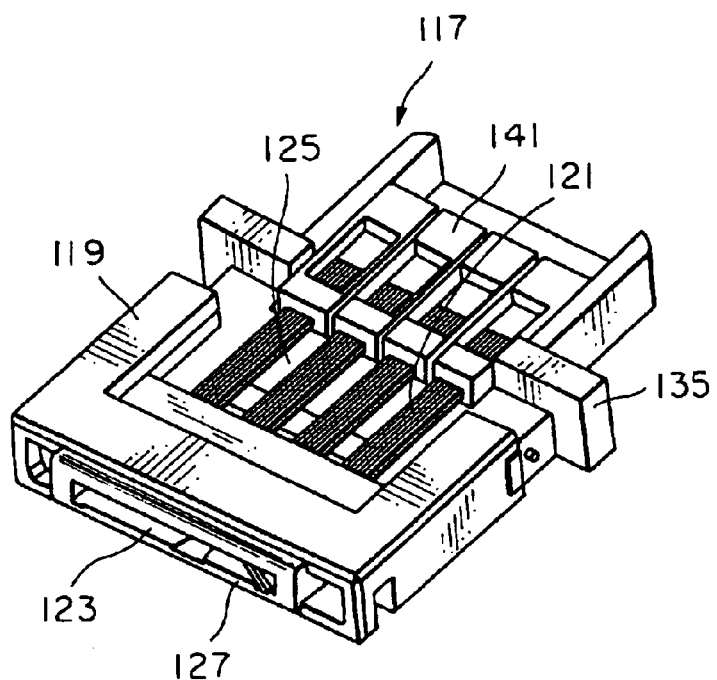
FIG. 13 is a perspective view of a plug of the optical connector of FIG. 7.

As best seen in FIG. 13, the plug 117 of the optical connector is designed to accommodate multi-core optical fibers 121 in a housing 119. The front end of the housing 119 of the plug 117 includes an opening and a fiber protector 127, which is slidable in the coupling direction. The housing 119 includes alignment members 125 and clamps 141 so that the multi-core optical fibers 121 can be fixed in aligned in parallel. With the end adjacent to the fiber protector 127 being the leading end, the plug 117 is inserted into the opened coupling portion 91 of the housing 75 through the opening 85, which is the rear opening of the housing 75 from a left end of the housing toward a right end of the housing. In addition, reference number 135 represents a stopper to attach to a groove 13 of the rear housing 87 when inserted in the reahousing.

Figure 14:
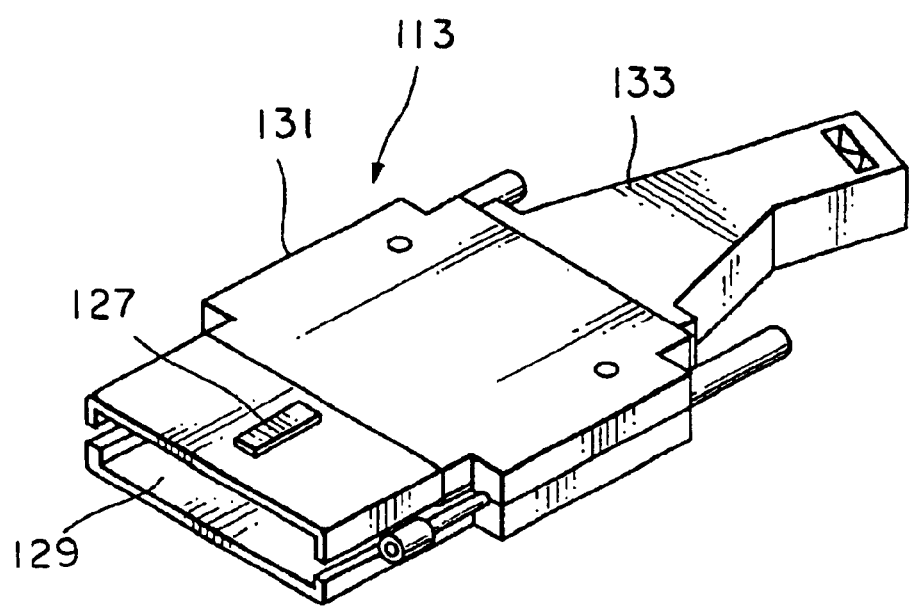
FIG. 14 illustrates a plug for another optical connector coupled to the optical connector.

As shown in FIG. 14, the plug 113 has the shape of the plug 117 shown in FIG. 13 with covers around the periphery thereof. The plug 113 includes a coupling tubular portion 129 having a rectangular cross-section with the opening 123, a shell portion 131, and a cable guide portion 133.

Referring back to FIGS. 7, 9, and 14, the operation of the optical connector 73 is as follows. Firstly, the plug 113 is inserted into the first housing 83 in the coupling direction in such a manner that the end adjacent to the opening 123 is the leading end. In this time, a key groove 135 of the first housing 83 is arranged at the upper front of the plug 113 to fit a key 137 of the plug 113. In FIG. 9, the plug 113 is inserted from the right-hand side. When the plug 113 enters the coupling portion 91, the front end of the plug 113 initially makes contact with the shutter plate 77. The front end of the plug 113 pushes the blocking component 81 in the entering direction, but the shutter plate 77 is not deformed and the elastic portion 79 is deformed instead. The optical plug connector 113 pushes the shutter plate 77 up toward the rear against the resilience of the elastic portion 79 in such a manner that the shutter plate 77 pivots about the pivot component 93 clockwise in the figures and then the optical axis 115 is unblocked.

In this case, the groove 97 accommodates the rectilinear portion 95 of the shutter plate 77 so that the pivot of the shutter plate 77 to the front end is controlled. Additionally, with respect to the pivot to the rear end, the shutter plate 77 remains pivoted upward until the shutter plate 77 reaches the elastic portion 79 so that the shutter plate 77 moves near to the upper face 109 of the housing 75 when the plug 113 is fully coupled.

Upon extraction of the plug 113, the shutter plate 77 moves down again by the resilience of the elastic portion 79 to a position blocking the optical axis.

As described above, the optical connector 73 of the present invention does not deform the shutter plate 77 in the blocking component 81. The elastic portion 79 has the base 139 adjacent to the end of the shutter plate 77 and its forward end disposed adjacent to a coupling face. Therefore, deformation of the elastic portion 79 allows the elastic portion 79 to have a constant resilience even in the optical connector for multiple cores.

Moreover, disposing the forward end (point of application of force) of the elastic portion 79 nearer to the coupling face enables reduced deformation of the elastic portion 79 and reduced resilience thereof.

Furthermore, mounting the blocking component 81 so as to be inclined enables elongated length of the elastic portion 79 and reduced resilience thereof.

According to the embodiments of the present invention, the shutter plate 77 and the elastic portion 79 in the blocking component 81 are formed from the same metal plate. The blocking component 81 may be formed in an integrated structure in which the elastic portion 79, which comprises an elastic material such as a metal plate, a rubber, or a resin, is molded with the resin shutter plate 77.

The shutter plate 77 and the elastic portion 79 may be discretely formed. The support portion 111 of the shutter plate 77 may be fixed to the housing 75 and the base 139 may be arranged to press against the shutter plate 77 around the opening.

Although not described in the embodiments of the present invention above, the blocking component 81 may be disposed vertically. This arrangement allows the length of the shutter plate 77 to be decreased and results in a low material cost. Although the vertical blocking component needs great variation in elasticity, the elastic body used in the opening 123 enables minimized reaction force.

As described above, the present invention provides an optical connector including a blocking component suitable for multiple cores without a change in the insertion force of a plug of another optical connector.

What is claimed is:

1. An optical connector comprising:

a housing having an opening formed therein for coupling another optical connector; and a blocking component disposed and extending within the opening for blocking an optical axis, wherein the blocking component has a shutter plate blocking or shading the optical axis and being pivotably supported by the housing with a pivot shaft and an elastic portion separated from the shutter plate and mounted on the housing for normally biasing the shutter plate to a closed position, the shutter plate including an opening portion formed therethrough in which the elastic portion is disposed, wherein the elastic portion is disposed at a side of the pivot shaft and wherein an opposite side of the elastic portion for applying a force to the shutter plate is disposed in the position blocking the optical axis, the elastic portion having one end formed integral with an edge of the opening portion and another end formed to be a support portion fitted to an upper or bottom face of the housing, the shutter plate pivoting between the closed position and an opened position to which the shutter plate is forced to move by another optical connector when the other optical connector is inserted into the opening of the housing.

2. The optical connector according to claim 1, wherein the optical connector connects a plurality of optical cables.

3. The optical connector according to claim 1, wherein the other optical connector in an optical connector including a plug.

4. The optical connector according to claim 1, wherein the shutter plate and the elastic portion are formed in an integrated structure.

5. The optical connector according to claim 1, wherein the shutter plate and the elastic portion comprise an identical metal.

6. The optical connector according to claim 1, wherein the shutter plate comprises a resin and is integrally molded with the elastic portion.

* * * * *